Oct. 25, 1966  E. S. STODDARD, JR  3,280,903
EXHAUST SILENCER AND HEAT RECOVERY UNIT
Filed Dec. 21, 1964
2 Sheets-Sheet 1
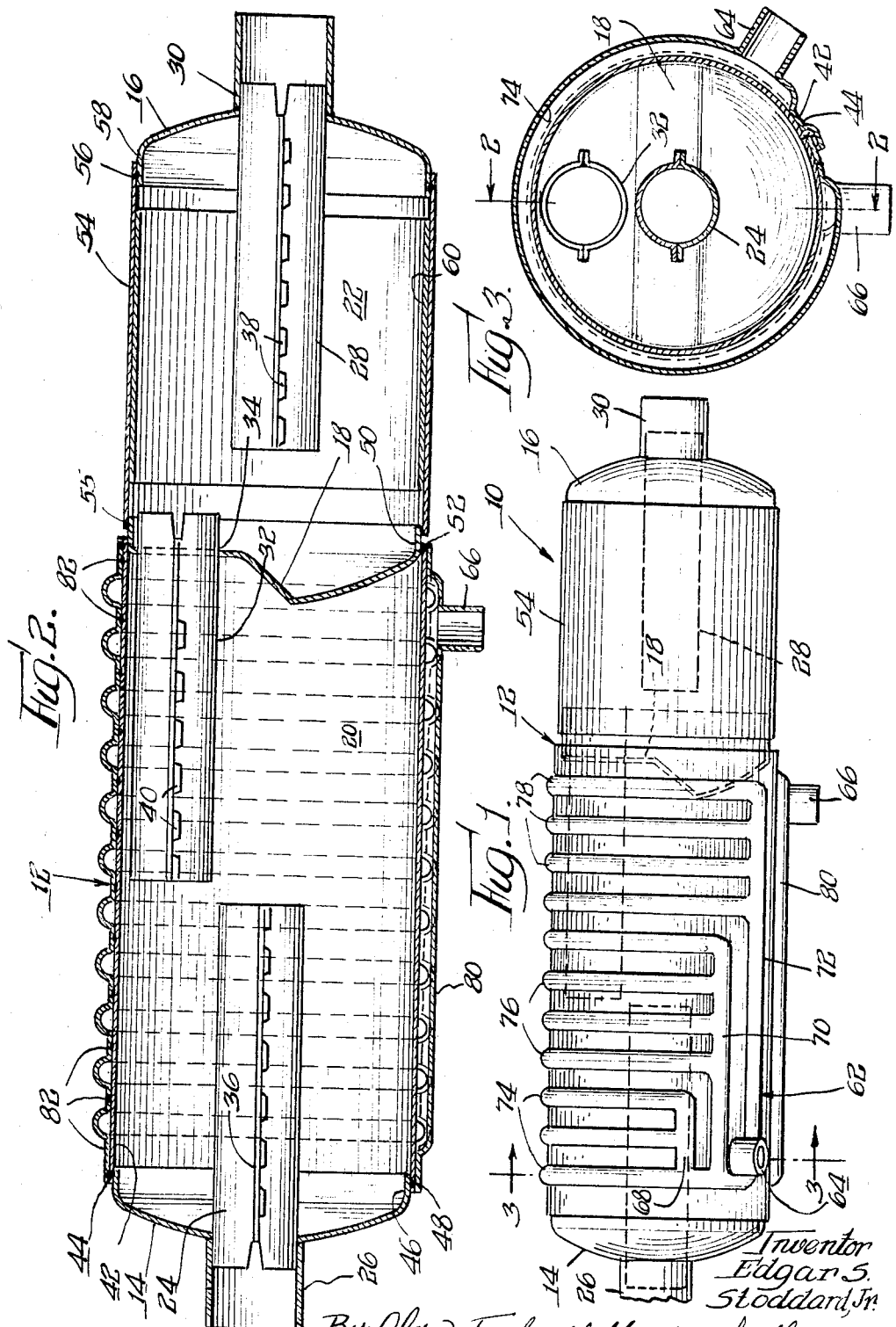
Inventor
Edgar S. Stoddard, Jr.
By: Olson, Trexler, Wolters & Bushnell  attys.

Oct. 25, 1966    E. S. STODDARD, JR    3,280,903
EXHAUST SILENCER AND HEAT RECOVERY UNIT
Filed Dec. 21, 1964    2 Sheets-Sheet 2
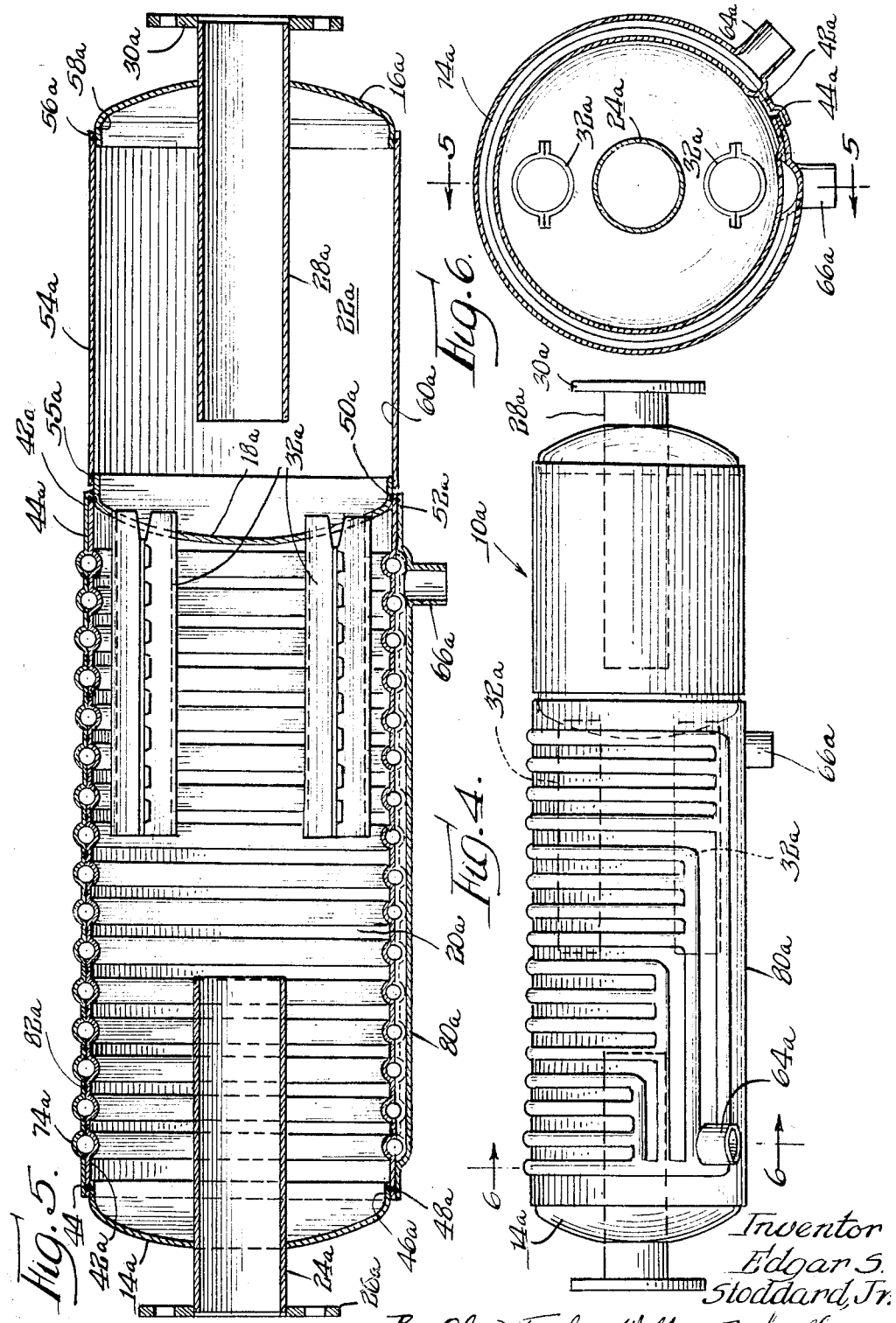
Inventor
Edgar S. Stoddard, Jr.
By Olson, Trexler, Wolters & Bushnell attys 3,280,903
EXHAUST SILENCER AND HEAT
RECOVERY UNIT
Edgar S. Stoddard, Jr., Wildwood, Ill., assignor to Universal Silencer Corporation, Libertyville, Ill., a corporation of Illinois
Filed Dec. 21, 1964, Ser. No. 420,012
3 Claims. (Cl. 165—135)

The present invention relates to a novel exhaust muffler or silencer.

It has long been recognized that substantial portions of the energy input into internal combustion engines are wasted and are discharged as heat with the exhaust gases. Such waste is of particular significance in installations such as power stations, pumping stations and the like utilizing internal combustion engines. Furthermore, it is desirable to provide mufflers or silencers for such internal combustion engines capable of reducing engine exhaust noises to an acceptable level efficiently and without creating undue back pressures.

It is an important object of the present invention to provide a novel structure of relatively simple and economical construction and adapted to be connected with internal combustion engines for both silencing engine noises and recovering a significant portion of the heat which is normally lost with the exhaust gases.

Another important object of the present invention is to provide a novel combined silencer and heat recovery unit which is constructed for efficiently removing heat from exhaust gases and also for tending to minimize back pressures within the unit and thereby increase efficiency of engine operation.

Still another object of the present invention is to provide a novel unit for removing heat from exhaust gases and obtaining an improved silencing action.

Still another object of the present invention is to provide a novel combined silencer and heat exchanger unit which may be readily substituted for ordinary silencer units heretofore in use.

Other objects and advantages of the present invention will become apparent from the following description and the accompanying drawings wherein:

FIG. 1 is an elevational view showing a muffler or silencer unit incorporating features of the present invention;

FIG. 2 is an enlarged partial sectional view taken generally along line 2—2 in FIG. 3 and showing the silencer unit of FIG. 1;

FIG. 3 is a sectional view taken along line 3—3 in FIG. 1;

FIG. 4 is a side elevational view showing a silencer unit embodying a modified form of the present invention;

FIG. 5 is an enlarged partial sectional view taken along line 5—5 in FIG. 6; and FIG. 6 is a sectional view taken along line 6—6 in FIG. 4.

Referring now more specifically to the drawings wherein like parts are designated by the same numerals throughout the various figures, a silencer 10 incorporating features of the present invention is shown in FIGS. 1, 2 and 3. As will be described more fully below, the silencer is adapted to be connected in the exhaust system of an internal combustion engine for silencing engine noises. In addition the silencer is adapted to be connected with a piping or conduit system, not shown, for cooling water or any other desired heat transfer fluid for extracting heat from the exhaust gases passing through the silencer unit and thereby heating the water or fluid. Of course, the heated water or fluid may then be used for any desired purpose.

The muffler or silencer 10 comprises elongated body means including elongated tubular side means 12 and opposite end members 14 and 16. A transverse partition 18 is disposed within the tubular means 12 and combines with the end member 14 in defining a chamber 20 and with the end member 16 in defining a chamber 22. As will be understood, additional intermediate partitions may be provided for defining additional intermediate chambers in accordance with the silencing or acoustical requirements of a particular installation.

An inlet tube 24 extends axially through the inlet end member 14 and opens into the chamber 20. A nipple or other suitable fitting 26 is welded or otherwise secured to an outer end portion of the tube 24 for connecting the silencer unit to a complementary fitting or pipe of an engine exhaust system, not shown. An outlet tube 28 extends through the outlet end member 16 of the body means and is connected with a nipple or fitting 30 as by welding, which fitting is in turn adapted to be connected with a complementary fitting or pipe of the engine exhaust system.

Gas passageway means is provided through the central partition 18 for permitting the flow of exhaust gases from the chamber 20 into the chamber 22. In the embodiment shown, the passageway means comprises a tube 32 extending through an aperture 34 in the partition 18. The tube 32 is offset from the inlet tube 24, and preferably the inlet end of the tube 32 is disposed immediately adjacent the outlet end of the tube 24 so that exhaust gases emerging from the tube 24 are initially directed toward the baffle or partition 18 from which they are deflected and circulated around within the chamber 20 before entering the tube 32 and passing on into the chamber 22.

The passageway means through the partition 18 or, in other words, the tube 32 is also laterally offset from the outlet tube 28 so that a major portion of the gases is directed along the outlet tube 28 to the end member 16 from which the gases are deflected for circulating around within the chamber 22 before entering into the outlet tube 28.

As indicated above, the exhaust gases are deflected within the chambers 20 and 22 and flow in circuitous paths of travel through the chambers and throughout the silencer unit for enhancing the silencing action. In order further to increase the paths of travel of portions of the exhaust gases, the inlet tube is formed with a series of axially spaced circular apertures or elongated slots 36 for enabling portions of the gases to escape through the sides of the tube 24 rather than through the open inner end of the tube. Similar slots or apertures 38 and 40 are formed in the tubes 28 and 32 for enabling portions of the exhaust gases to pass through the sides of these tubes as well as through the ends thereof.

As indicated above, the silencer unit 10 is constructed for enabling heat to be extracted from the exhaust gases passing therethrough. More specifically, the tubular side means of the silencer body is formed with a laminated section comprising inner and outer cylindrical plates 42 and 44. While the axial length of the plates 42 and 44 may be varied and may even, in certain installations, extend for the full length of the muffler body, the cylindrical plates 42 and 44 are preferably at least co-extensive with the inlet and chamber 20. The inner cylindrical plate 42 provides the interior wall of the chamber 20 and is directly contacted by the hot exhaust gases flowing through the chamber 20.

As shown best in FIG. 2, one end of the cylindrical plate 42 telescopes over a cylindrical flange portion 46 of the end member 14 and is secured thereto by an annular weld 48. An opposite end of the cylindrical plate 42 telescopes over a cylindrical flange portion 50 of the intermediate partition 18 and is secured thereto by another annular weld 52.

In order to complete the cylindrical body means 12 in this embodiment another cylindrical or tubular member 54 is welded to the flange 50 at 55 and extends around the chamber 22 to the end member 16. The tubular member 54 is secured by an annular weld 56 to a cylindrical flange 58 of the end member 16. Preferably the interior surface of the tubular member 54 is substantially covered by a metal tubular liner 60 which may be secured in position by suitable spot welds or other means and which extends substantially between the terminal ends of the flanges 50 and 58.

At least one of the cylindrical plates of the laminated sections is embossed for providing fluid passageways adapted to accommodate the flow of water or other fluid for extracting heat from the exhaust gases passing through the chamber 20. In this embodiment, the outer cylindrical plate member 44 is embossed to provide cooling fluid passageway means 62. An inlet fitting 64 is welded or otherwise secured to the plate member 44 and communicates with an inlet opening of the passageway means 62 and an outlet fitting 66 is similarly secured to the plate member and communicatees with an outlet end of the passageway means. It will be appreciated that the fittings 64 and 66 are adapted to be connected to complementary fittings or pipes of a conduit system, not shown, for cooling fluid to and from unit 10. It will be further appreciated that the passageway means 62 formed by embossing the plate member 44 may have a variety of different configurations. In the embodiment shown, the passageway means 62 comprises a plurality of inlet and manifold sections 68, 70 and 72 extending generally axially of the silencer body and respectively communicating with groups of circularly extending passageways 74, 76 and 78. The circularly extending passageways in turn communicate with an outlet end manifold section 80 which extends axially of the silencer unit and is connected with the outlet fitting 66.

In order to prevent leakage of the fluid from the various passageway portions, the cylindrical plate members 42 and 44 are welded together continuously along lines extending entirely around and between each of the portions or sections of the passageway means 62 as indicated, for example, by the welds 82 shown in FIG. 2.

While the plate member 44 is embossed to provide the aforementioned fluid passageway means, the cylindrical inner plate member also serves to define the inner side of the passageway means and, as indicated previously, defines the chamber 20 and is directly contacted by the exhaust gases. Thus highly efficient heat transfer is obtained between the exhaust gases and the cooling fluid through the thin sheet metal cylindrical member 42 which is inherently a good heat conductor. This efficiency is further promoted by the aforementioned construction which causes the exhaust gases to flow in a turbulent manner within the chamber 20 so as to insure having a continuous impingement of freshly heated exhaust gases against the interior surface of the plate member 42. This action not only promotes effective recovery of heat which would otherwise be wasted, but further tends to reduce back pressure within the muffler unit as a result of the cooling of exhaust gases, thereby increasing the efficiency of the engine operation.

In FIGS. 4 through 6 there is shown a modified form of the present invention which is similar to the structure described above as indicated by the application of identical numerals with the suffix a added to corresponding elements. One difference in this embodiment is that the inner cylindrical plate member 42a is embossed as well as the outer cylindrical plate member 44a as shown in FIGS. 5 and 6 so that the various portions of the passageway means 62a have circular transverse cross-sections. Furthermore, the embossment of the inner cylindrical plate member 42a is in an inward direction so that the elements of this plate member providing the inner sides of the passageways also present a plurality of inwardly projecting ribs 83 within the chamber 20a for further promoting turbulent flow of the exhaust gases and more extensive contact between the exhaust gases and the plate member 42a for increasing the heat transfer efficiently.

While preferred embodiments of the invention have been described and shown herein, it is obvious that many structural details may be changed without departing from the spirit and scope of the appended claims.

The invention is claimed as follows:

1. An exhaust silencer and heat recovery unit comprising: a first circular endwall; a cylindrical central partition means; first flange means extending inwardly from said first endwall toward said central partition means; second flange means extending from said central partition means; a first cylindrical sidewall means having a first end portion connected to said first flange means and a second end portion connected to said second flange means; said first endwall, central partition means and first sidewall means defining a first cylindrical inlet chamber means; a second circular endwall; a third flange means extending inwardly from said second endwall toward said central partition means; a second cylindrical sidewall means interconnecting said second and third flange means to define a second outlet chamber means; exhaust gas inlet tube means mounted in a center portion of said first endwall and extending into said first chamber means; intermediate exhaust gas tube means mounted in said central partition means in a position spaced apart from and substantially parallel to said first sidewall means, said intermediate exhaust gas tube means extending from said first inlet chamber means through said central partition means and into said second outlet chamber means; an exhaust gas outlet tube means mounted in a center portion of said second endwall and extending outwardly from said second outlet chamber means; said inlet, intermediate, and outlet exhaust gas tube means having longitudinal axes generally parallel to the longitudinal axes of said first and second chamber means; a third generally cylindrical sidewall means fastened to an outer surface of said first sidewall means; a plurality of fluid passage means defined by the outer surface of said first sidewall means and inner surfaces of a plurality of arcuate outwardly projecting portions of said third sidewall means, said fluid passage means extending around said first sidewall means in a direction transverse to the longitudinal axis of said first chamber means; first outwardly protruding manifold means formed in said third sidewall means, said first manifold means extending parallel to the longitudinal axis of said first chamber means and interconnecting first end portions of said fluid passage means; and a second outwardly protruding manifold means formed in said third sidewall means, said second manifold means extending parallel to the longitudinal axis of said first chamber means and interconnecting second end portions of said fluid passage means, whereby a cooling fluid flows from said first manifold means, through said passage means and into said second manifold means, in a direction transverse to the general direction of flow of exhaust gases through said inlet, intermediate and outlet exhaust gas tubes.

2. An exhaust silencer and heat recovery unit comprising: a first circular endwall; a circular central partition means; first flange means extending inwardly from said first endwall toward said central partition means; a second flange means extending from said central partition means; a first cylindrical sidewall means having a first end portion connected to said first flange means and a second end portion connected to said second flange means; said first endwall, central partition means and first sidewall means defining a cylindrical inlet chamber means; a second circular endwall; a third flange means extending inwardly from said second endwall toward said central partition means; a second cylindrical sidewall means interconnecting said second and third flange means to define an outlet chamber means; exhaust gas inlet tube means mounted in a center portion of said first endwall and extending into said inlet chamber means; intermediate exhaust gas tube means mounted in said central partition means in a position spaced apart from and substantially parallel to said first sidewall means, said intermediate exhaust gas tube means extending from said inlet chamber means through said central partition means and into said outlet chamber means; an exhaust gas outlet tube means mounted in a central portion of said second endwall and extending outwardly from said outlet chamber means; said inlet, intermediate and outlet exhaust gas tube means having longitudinal axes generally parallel to longitudinal axes of said inlet and outlet chamber means; a third sidewall means fastened to an outer surface of said first sidewall means; a plurality of fluid passage means defined by inner surfaces of a plurality of arcuate outwardly projecting portions of said third sidewall means and outer surfaces of a plurality of arcuate inwardly projecting portions of said first sidewall means, said fluid passage means extending around said first sidewall means in a direction transverse to the longitudinal axis of said inlet chamber means; first outwardly protruding manifold means formed by an outwardly projecting portion of said third sidewall means and an inwardly projecting portion of said first sidewall means, said first manifold means extending parallel to the longitudinal axis of said inlet chamber and interconnecting first end portion of said plurality of fluid passage means; and a second outwardly protruding manifold means formed by an outwardly protruding portion of said third sidewall means and an inwardly protruding portion of said first sidewall means, said second manifold means extending parallel to the longitudinal axis of said inlet chamber means and interconnecting second end portions of said plurality of fluid passage means, whereby a cooling fluid flows from said first manifold means, through said fluid passage means and into said second manifold means in a direction transverse to the general direction of flow of exhaust gases through said inlet, intermediate and outlet gas tube means.

3. An exhaust cylinder and heat recovery unit as set forth in claim 2, further including a second intermediate exhaust gas tube means mounted in said central partition means in a position parallel to said first sidewall means and extending from said inlet chamber means through said central partition means and into said outlet chamber means.

References Cited by the Examiner
UNITED STATES PATENTS

| | | | |
|---|---|---|---|
| 1,556,934 | 10/1925 | Hilldring | 165—135 X |
| 2,095,999 | 10/1937 | Miles | 181—46 |
| 2,397,208 | 3/1946 | Saco et al. | 165—135 X |
| 2,544,284 | 3/1951 | Stephens et al. | 181—46 |
| 2,562,101 | 7/1951 | Hoyle | 181—41 X |
| 2,624,418 | 1/1953 | Bourne | 181—46 |
| 2,626,130 | 1/1953 | Raskin | 165—169 X |
| 2,938,593 | 5/1960 | Miller et al. | 181—46 |
| 2,995,807 | 8/1961 | Gibbs | 165—169 X |

ROBERT A. O'LEARY, *Primary Examiner.*

M. A. ANTONAKAS, *Assistant Examiner.*